W. GREGERSEN.
SURF OR WAVE MOTOR.
APPLICATION FILED JUNE 25, 1918.

1,307,095.

Patented June 17, 1919.
2 SHEETS—SHEET 1.

Inventor;
William Gregersen

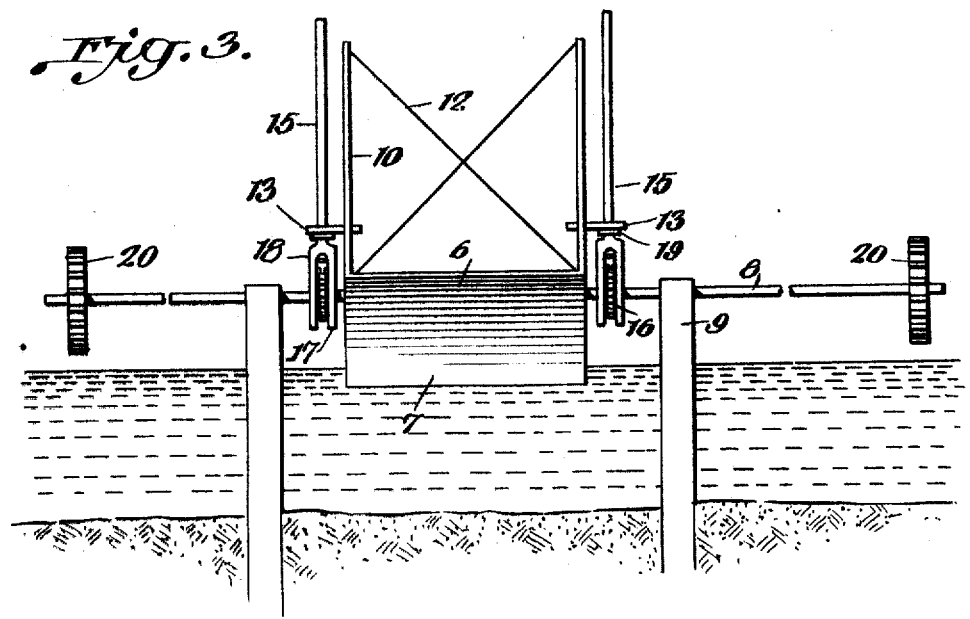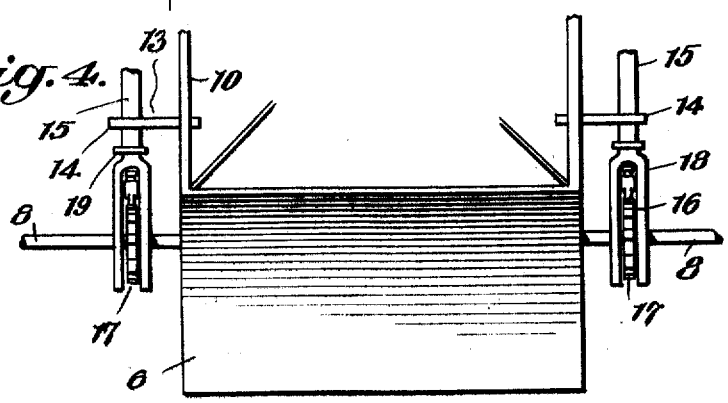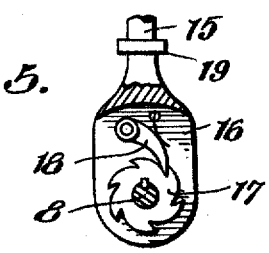

UNITED STATES PATENT OFFICE.

WILLIAM GREGERSEN, OF ST. ANDREWS PARISH, SOUTH CAROLINA.

SURF OR WAVE MOTOR.

1,307,095.   Specification of Letters Patent.   Patented June 17, 1919.

Application filed June 25, 1918.  Serial No. 241,867.

*To all whom it may concern:*

Be it known that I, WILLIAM GREGERSEN, a citizen of the United States, residing at St. Andrews Parish, in the county of Charleston and State of South Carolina, have invented new and useful Improvements in Surf or Wave Motors, of which the following is a specification.

The invention relates to motors and more particularly to the class of surf or wave motors.

The primary object of this invention is the provision of a motor of this character wherein the incoming tide of the waves in a body of water will exert force which will operate the motor so that the power from the wave or surf can be utilized for the driving of machinery or the like.

Another object of the invention is the provision of a wave motor in which the body thereof is in the form of a boat pivotally supported so that it will rock and thereby operate the mechanism which will in turn rotate a shaft so that the rotary motion thereof can be transferred to machinery or the like for the driving of the same from the force of the waves or surf in a body of water.

A further object of the invention is the provision of a wave motor which is simple in construction, durable, may be easily and conveniently operated and one which is thoroughly reliable and efficient in the performing of its functions, as well as being inexpensive to manufacture.

With these and other objects in view the invention consists in the construction, combination and arrangement of parts as will be hereinafter fully described, illustrated in the accompanying drawings, and pointed out in the claims hereunto appended.

In the drawings:

Fig. 3 is an end elevation.

Fig. 4 is a vertical transverse sectional view.

Fig. 5 is a view of the ratchet wheel and operating lever.

Similar reference characters indicate corresponding parts throughout the several views in the drawings.

Figure 1:
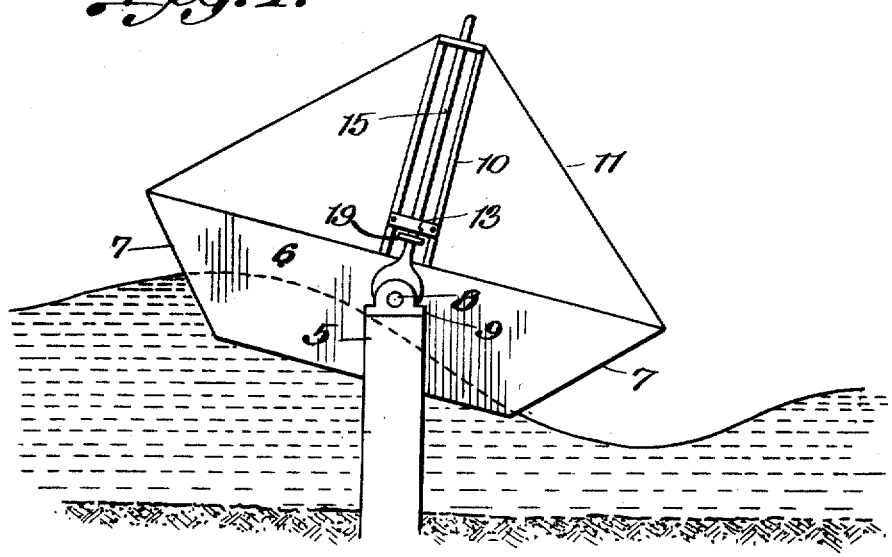
Figure 1 is a side elevation of a motor constructed in accordance with the invention, the same being shown tilted in one position by the incoming tide of a body of water.

Referring to the drawings by numerals, the surf or wave motor comprises a pair of spaced vertical columns or posts 5 which are anchored in the bed of a body of water near the shore thereof, and arranged between these columns or posts is a flat boat-shaped body 6 having inwardly sloping ends 7, the body being supported for rocking movements upon a shaft 8, which is loosely passed through the body medially thereof, and also is journaled in bearings 9 suitably mounted upon the columns or posts 5, the said body 6 being placed a suitable distance above the bed of the body of water and is so positioned as to receive the force and impact of the incoming and ebbing tide or surf, whereby the body rocks upon the shaft for rotating the same in a manner presently described.

Fixed to and rising from the boat body 6 centrally thereof are uprights 10 which are arranged in spaced relation to each other and in pairs at opposite sides of the body. Connected to the ends of the boat body 6 and to the uprights are upwardly converging rigging forming braces 11, the said uprights also being connected with cross braces 12 so as to assure strength and rigidity thereto.

Adjustably fixed in the uprights 10 in any suitable manner are perforated ears 13 which extend outwardly and laterally from the sides of the boat body 6 and which are provided with openings 14 through which are passed operating levers 15, each being formed with a fork 16 at its inner end which loosely engages the shaft 8 which has fixed thereto ratchet wheels 17, the same being open as hereinafter specified.

Carried in the forks 16 are spring held pivoted pawls 18 which are adapted to ride upon the top of the ratchet wheels 17 for engagement therewith whereby on the rocking of the boat body 6 the levers 15 will operate for the intermittent releasing and engaging of the pawls 18 from and with the teeth of the ratchet wheels 17 for imparting rotation to the shaft 8 for the driving thereof. The levers 15 have fixed thereto stops 19 which are adapted to be engaged by the guide ways 13 so as to steady the boat body 6 when passive or when operated thereon by the force of the waves or the surf on the incoming or ebbing of the tide.

Figure 2:
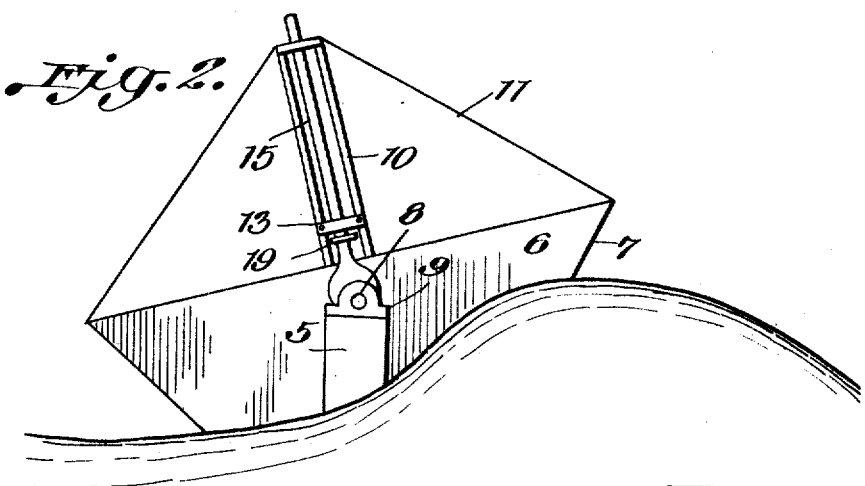
Fig. 2 is a similar view showing the body of the motor in a reverse position on the ebb of the tide.

The shaft 8 has fixed thereto at opposite sides of the boat body 6 fly wheels 20 which assure a uniform momentum during the driving of the shaft when the motor is in operation. In the operation of the motor the incoming tide exerts an impact force against one end of the boat body 6 causing it to rock to the position shown in Fig. 1. The pawl 18 being engaged with the ratchet wheel 17 will effect a turning of the shaft 8 thereby turning the same in one direction. Now, on the ebbing of the tide the boat body 6 will be rocked in a reverse direction or to the position shown in Fig. 2 of the drawing and during this movement of the said body the pawls 18 will ride over the ratchet wheels 17 so as not to impede or interfere with the rotation of the shaft 8.

From the foregoing it is thought that the construction and manner of operation of the device will be clearly understood.

What is claimed is:

1. A motor of the class described comprising supports, a rotatable shaft journaled upon said supports, a rocking body mounted upon the shaft, uprights rising from the said body, ratchet wheels fixed to the shaft at opposite sides of the body, operating levers slidably engaging the uprights, said shaft loosely journaled in said operating lever, and pivoted spring held pawls mounted on the levers and engaging said ratchet for turning the same on the rocking of the body whereby motion will be imparted to the shaft.

2. A motor of the class described comprising supports, a rotatable shaft journaled upon said supports, a rocking body mounted upon the shaft, uprights rising from the said body, ratchet wheels fixed to the shaft at opposite sides of the body, operating levers slidably engaging the uprights, said shaft loosely journaled in said levers, pivoted spring held pawls mounted on the levers and engaging said ratchet wheels for turning the same on the rocking of the body whereby motion will be imparted to the shaft, and fly wheels carried by the same shaft.

3. A motor of the class described comprising supports, a rotatable shaft journaled upon said supports, a rocking body mounted upon the shaft, uprights rising from the said body, ratchet wheels fixed to the shaft at opposite sides of the body, operating levers slidably engaging the uprights, said shaft loosely journaled in said levers, pivoted spring held pawls mounted on the levers and engaging said ratchet for turning the same on the rocking of the body whereby motion will be imparted to the shaft, fly wheels carried by the same shaft, and guide ways mounted upon the uprights and engaging the operating levers.

4. A motor of the class described comprising supports, a rotatable shaft journaled upon said supports, a rocking body mounted upon the shaft, uprights rising from the said body, ratchet wheels fixed to the shaft at opposite sides of the body, operating levers slidably engaging with the uprights, said shaft loosely journaled in said levers, pivoted spring held pawls mounted on the levers and engaging said ratchet for turning the same on the rocking of the body whereby motion will be imparted to the shaft, fly wheels carried by the same shaft, guide ways mounted upon the uprights and engaging the operating levers, and stops upon the operating levers and coöperating with the guide ways.

5. In a wave motor, a rockable body, uprights rising from said body, operating levers slidably engaging said uprights, a shaft loosely journaled in said levers, and means connecting said shafts and levers to rotate the shaft upon movement of the levers by the rocking of said body.

6. In a wave motor, a shaft, a rockable body, uprights rising from said body, operating levers slidably engaging said uprights and means connecting said shaft and levers to rotate the shaft upon movement of the levers by rocking of said body.

7. In a wave motor, a shaft, a rockable body, uprights rising from said body, operating levers slidably engaging said uprights, ratchets carried by said shaft, and pawls carried by said levers for engaging said ratchets to rotate the shaft upon movement of the levers by the rocking of said body.

8. In a wave motor, a shaft, a body rockably mounted upon said shaft, operating levers slidably engaging said body, ratchets carried by said shaft, and pawls carried by said levers and engaging said ratchets to rotate said shaft by the rocking of said body.

In testimony whereof I affix my signature in presence of two witnesses.

WILLIAM GREGERSEN.

Witnesses:
  J. LAMB PERRY, Jr.,
  WATSON C. FINGER.

Copies of this patent may be obtained for five cents each, by addressing the "Commissioner of Patents, Washington, D. C."